United States Patent
Frederick et al.

[11] 3,811,163
[45] May 21, 1974

[54] PLUNGE MILLING TOOL

[75] Inventors: Norman L. Frederick, San Diego; Charles L. Bennett, Poway, both of Calif.

[73] Assignee: General Dynamics Corporation, San Diego, Calif.

[22] Filed: Dec. 7, 1972

[21] Appl. No.: 313,035

[52] U.S. Cl............... 29/103 A, 29/105 R, 29/106, 408/59, 175/412
[51] Int. Cl............................................. B26d 1/12
[58] Field of Search.......... 29/103 A, 105 R, 105 A, 29/106; 408/59; 175/412, 413

[56] References Cited
UNITED STATES PATENTS

| | | | |
|---|---|---|---|
| 2,807,443 | 9/1957 | Wyman | 175/412 X |
| 3,737,245 | 6/1973 | Mater | 408/59 X |
| 2,662,428 | 12/1953 | Mueller | 408/56 X |
| 2,901,222 | 8/1959 | Pease | 29/105 X |
| 2,969,699 | 1/1961 | Kleine | 408/199 |
| 3,158,922 | 12/1964 | Reese | 29/105 |
| 3,191,463 | 6/1965 | Ladendorf | 408/59 |
| 3,139,149 | 6/1964 | Dionisotti | 175/413 |

*Primary Examiner*—Leonidas Vlachos
*Attorney, Agent, or Firm*—Hugo F. Mohrlock

[57] ABSTRACT

A mill for deep removal of stock from a workpiece, such as machining pockets, wherein the mill cuts only in a Z direction. After reaching the desired depth, the mill is raised from the pocket and moved in an X or Y direction prior to plunging in for the next cut. A plurality of cutting blades is located on the face of the mill in such a way as to provide chip escape chambers up the inside of the mill, said chambers also serving to carry off the cutting fluid which is introduced to the pocket via a center bore in the mill, terminating at the face of the mill.

2 Claims, 12 Drawing Figures

PLUNGE MILLING TOOL

BACKGROUND OF THE INVENTION

The invention relates to pocket milling and more specifically to the pocket milling of high-strength thermal-resistant metals, such as, for example, titanium alloys, nickle base alloys, and cobalt base alloys.

Pocket milling is a type of milling operation in which deep pockets of material are removed from a workpiece thus leaving very thin upstanding webs forming a waffle pattern. A principal use of this type of milling is in the aerospace industry where large amounts of stock are removed from a piece of material so as to reduce its weight without undue sacrifice of strength and stiffness of the part. This process and the mill itself are not limited to the aerospace industry and may be used wherever a similar operation is desirable.

Current and future aerospace vehicles will probably comprise from 20 to over 50 percent by weight of parts manufactured from high-strength thermal-resistant metals such as titanium. Large and complex parts are manufactured from stock weighing as much as 1,500 pounds, wherein the final machined part weighs less than 200 pounds. Currently, the machining of high-strength thermal-resistant metals requires reduced speeds, feed rates, and cut dimensions, to alleviate tool wear, tool and part deflection, vibration and chatter of the tool and part, and other detrimenal conditions. With current machining rates of ½ to 2 cubic inches of metal removal per minute, utilizing milling machines costing on the average of more than 1 million dollars each, such machining would result in prohibitive expenditures in capital equipment to achieve desired production rates. Typical machine time ratios of high-strength thermal-resistant metals, such as for example titanium, range from 10 to 17 times that of aluminum alloys such as 7075-T6. Before parts can be economically produced, this ratio must be reduced to 1 or 2.

The machining method most widely used in production of aerospace parts is milling. Therefore, the greatest potential cost savings can be realized through extended tool life and increased metal removal rates in milling operations. In pocket milling an end mill is usually used. Typically end mills used for pocket milling range from ½ inch to 2 inches in diameter, since any larger diameter will not plunge satisfactorily due to the excessive amount of chips that cannot escape from the pocket and overheating of the tool, all to be described later herein. End mills have the capability of machining on their "end" or face, as well as along the side of the end mill, and contrary to their name, the sides of the mill cut more efficiently and are used the majority of the time an "end" mill is employed. A typical pocket is machined by plunging the end mill into the part a short distance (the face of the mill actively performing the cutting), then moving the mill in a transverse direction to mill a slot which is the width of the end mill diameter (the side of the mill actively performing the cutting). Typically the end mill cannot be plunged deeper than twenty percent of the mill diameter, since the slotting operation imposes a very high bending load on the mill, thereby necessitating feed speeds too low for practical use. Once the slot is cut the length of the pocket, additional transverse passes of the mill are made to widen the slot, each pass removing a swath having a width of approximately one-tenth to one-half the diameter of the end mill (the side again performing the cutting). After the slot has been widened to the approximate dimension of the pocket, the steps are again repeated to plunge deeper, slot, and widen the slot. This procedure is repeated again and again until the desired depth of the pocket is obtained, usually not to exceed one and one-half to two times the diameter of the end mill, because any deeper cuts require a longer mill thereby imposing a prohibitively high bending load on the end mill during the slotting operations. A final clean-up operation is performed along the walls and bottom of the pocket to remove the ledges formed by the many passes of the end mill. It should be noted that the plunge and slot operations are the slowest to perform since the full diameter of the mill is being worked. Slot widening passes are quicker, and usually result in more efficient removal of metal, because chip removal is far better and each cutting surface of the mill has a cooling period during the unloaded portion of each rotation of the mill.

Thus, difficulties have continued to exist in the pocket milling of high-strength thermal-resistant metals necessitating reduced tool speeds, feed rates, and pocket depths, to alleviate mechanical and thermal overloads on the tool and chatter and vibration of the tool or workpiece.

SUMMARY OF THE INVENTION

The present invention is properly described as a "plunge mill," that is, it cuts exclusively at the face of the mill in a Z direction, plunging into the metal. After reaching the desired depth, the mill is raised from the pocket thus machined, and moved transversely in an X or Y direction prior to plunging into the metal for the next cut. The plunge mill is used to rough cut the pocket at very high metal removal rates. Subsequently, the pocket must be finish-cut utilizing a conventional end mill in the manner previously described.

It is an object of the present invention to provide a method of pocket milling that will eliminate the milling problem previously described.

It is an object of the present invention to provide a method of pocket milling to close the technology gap between machining high-strength thermal-resistant metals and aluminum alloys.

It is an object of the present invention to obtain increased metal removal rates during roughing operations, where more than 90 percent of the metal is removed and where the largest time savings may be realized.

It is an object of the invention to provide a milling tool embodying high volume chip removal capabilities well beyond current milling tools.

Another object of the invention is to provide a high volume of cutting fluid to the machined surface and cutting edges for cooling, lubricating, and a vehicle for fast chip removal.

Another object of the invention is to provide a milling tool which produces small chips that are more readily removed from the cutting area.

Another object of the invention is to provide a milling tool which will significantly increase pocket milling production rates without deterioration in workpiece quality, while maintaining equivalent or improved tool life.

The above objects and others are accomplished by the present invention by utilizing a new and novel plunge mill having a plurality of cutting edges or blades located in the face of the mill and situated in close proximity to chip passageways which serve to rapidly expel chips and coolant from the pocket being machined.

DETAILED DESCRIPTION OF THE INVENTION

Figure 1:
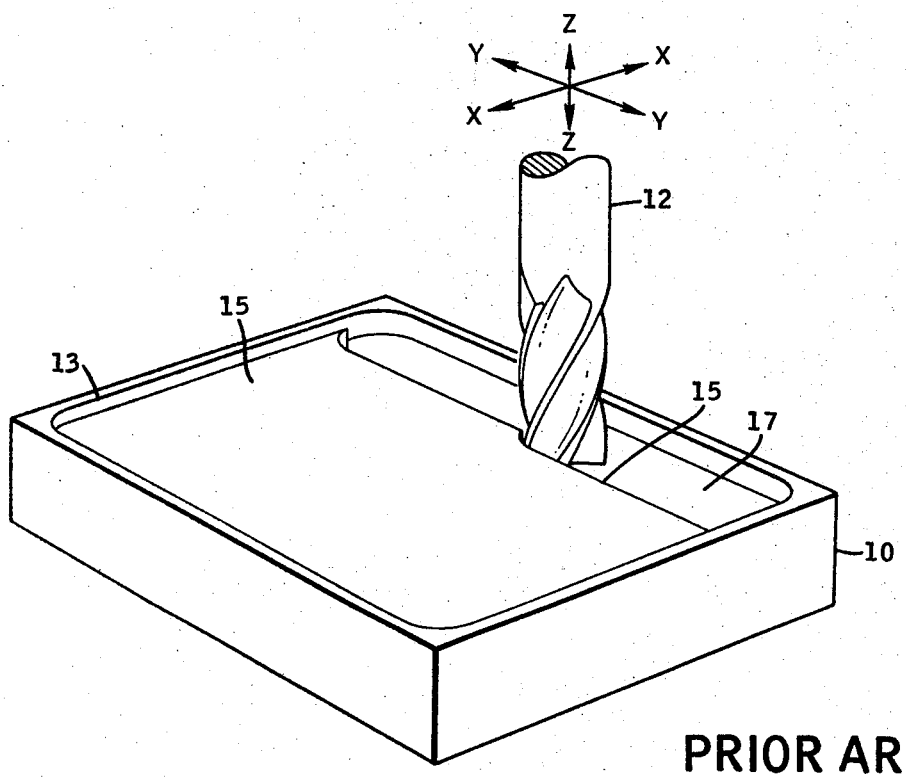
FIG. 1 illustrates the prior art method of pocket milling with the use of an end mill.

Referring now to the drawings in detail, FIG. 1 illustrates the prior art wherein a workpiece 10 is being machined by an end mill 12 to form a pocket of the shape 13. A complete first depth operation of plunging, slotting, and slot widening to the outline shape 13 and to the depth of surface 15 has been accomplished, as previously described. A second operation of plunging and slotting to the depth of surface 17 has been accomplished, and the end mill 12 is currently in the process of slot widening, the end mill 12 moving along the Y direction relative to the workpiece. This procedure will continue until the pocket has been machined to the desired depth, and a subsequent clean-up or finishing operation will complete the pocket.

Figure 2:
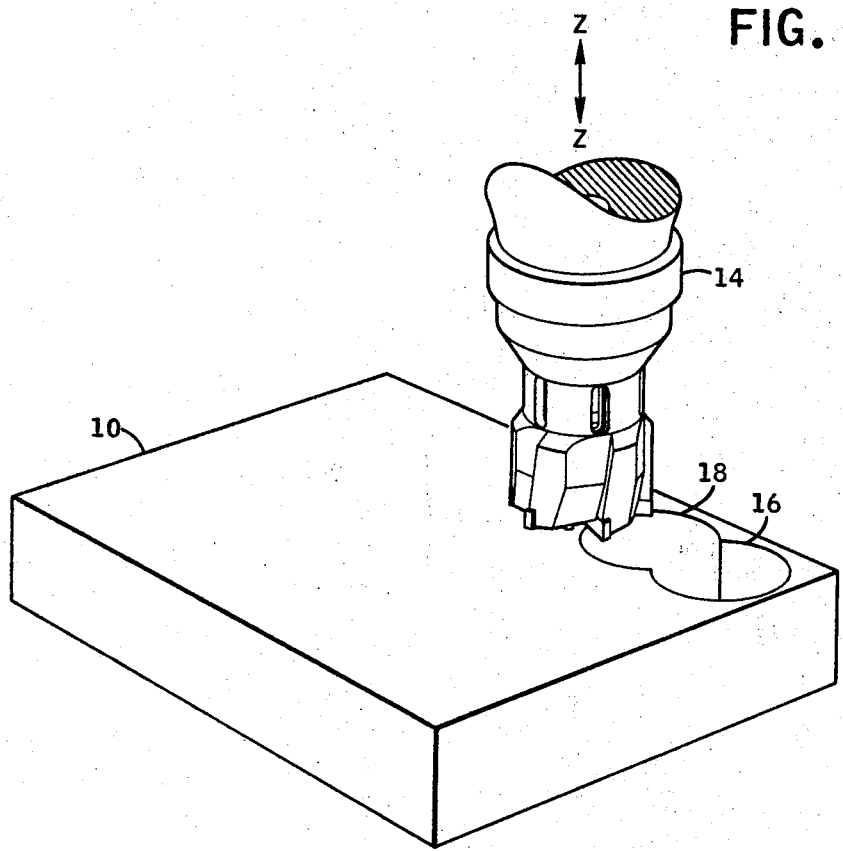
FIG. 2 illustrates the present invention method of pocket milling by plunge milling.

FIG 2 illustrates the same workpiece 10 being rough machined in accordance with the present invention, wherein plunge mill 14 has completed two plunges, 16 and 18, to the desired pocket depth and is in the process of making the third plunge. This procedure will continue until the rough removal of 90 percent or more of the metal from the pocket has been accomplished. A subsequent clean-up and finishing operation will complete the pocket.

It should be noted that end mill 12 of FIG. 1 will typically range from ½ to 2 inches in diameter, whereas the plunge mill 14 of FIG. 2 will typically range from 2 to 5 inches in diameter. Additionally, it should be remembered that depths beyond one and one-half to two times the diameter of end mill 12 cannot be satisfactorily machined because of excessive deflection, due to bending, of the end mill. The ratio for depth to diameter for plunge mill 14 may be considerably greater than 1½ to 2, since it is not used to slot the workpiece in the X or Y direction and therefor doesn't have these bending loads imposed upon it. However, if one assumes the same ratio as the end mill 12, it is clear that depths of 4 to 10 inches are possible with plunge mill 14 as compared with 1 to 4 inches for end mill 12.

Figure 5:
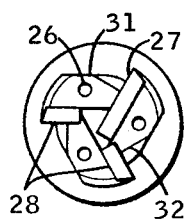
FIG. 5 is an end view of the blade end of the inner cutter of FIG. 3.
Figure 3:
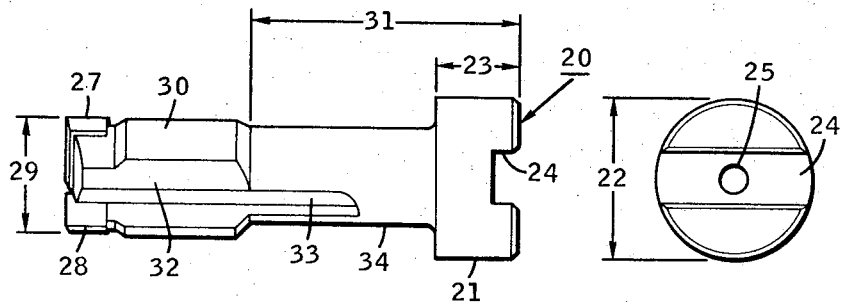
FIG. 3 is a side view of the inner cutter.
Figure 4:
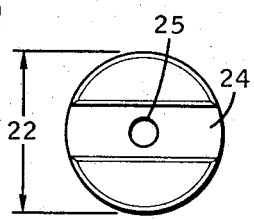
FIG. 4 is an end view of the inner cutter of FIG. 3.

FIGS. 3, 4, and 5 show details of the inner cutter 20 having a head 21 of diameter 22 and a thickness 23. In the top of the head 21 is a keyway 24, and located at the bottom surface of keyway 24 is a bore 25 extending part way down the center line of inner cutter 20. On the other end, the face end, of inner cutter 20 are three bores 26 having an angular relationship with the inner cutter centerline, such that the three bores 26 intersect the center bore 25 within the body of the cutter 20. Three blades 27 and 28 are inserted in the cutter 20, the blade 27 being longer than the other two blades 28, and said blade 27 extending inward beyond the centerline of cutter 20. The outermost tips of blades 27 and 28 lie on a diameter 29, which is the same diameter as circular portion 30 of cutter 20, portion 30 commencing a distance 31 from the top surface of head 21. Circular portion 30 is interrupted in three places by flat surfaces 32, each surface 32 also containing a flute 33 which extends up the body of cutter 20 beyond the flat surfaces into the round shank 34 of the cutter.

Blades 27 and 28 may be made from any suitable material such as high speed steel; particle metallurgy processed high speed steel; cobalt steel; carbide, including tungsten carbide, titanium carbide, coated carbide, and micro grain carbide; and ceramic, the choice being influenced by the material to be cut. The materials listed are in ascending order of hardness (and brittleness) and temperature resistance, and in descending order of transverse rupture strength. The blades may be attached by any suitable means such as welding, brazing, mechanical attachments such as screws and pins, or the blades may be an integral part of the cutter, the cutter being made from the desired material. It will be noted in FIG. 5 that the flutes 33 are located at the leading or cutting edge of blades 27 and 28 and provide a passageway up the sides of cutter 20, said passageway serving to carry off the chips generated by blades 27 and 28, which ill be described in more detail later herein. It also should be briefly noted at this time, before proceeding to the other portions of the mill, that bore 25 joined with the three bores 26 provides a passageway for cutting fluid to travel down the inside of cutter 20 and exit in the areas between blades 27 and 28.

Figure 7:
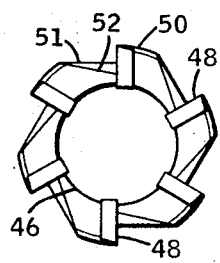
FIG. 7 is an end view of the blade end of the middle cutter of FIG. 6.
Figure 6:
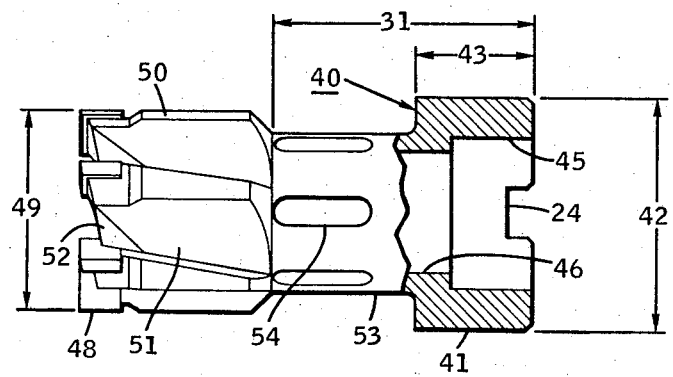
FIG. 6 is a side view of the middle cutter.

FIGS. 6 and 7 show details of the middle cutter 40, having a head 41 of diameter 42 and thickness 43. In the top of head 41 is a keyway 24, and a bore 45 of substantially the same diameter 22 and depth 23 of the head 21 of inner cutter 20 (FIG. 3). A second bore 46 of substantially the same diameter 29 of inner cutter 20 extends the rest of the way through middle cutter 40, so that inner cutter 20 may snugly fit within middle cutter 40, as will later be shown. In the face end of middle cutter 40 are located six blades 48, the outermost tips of said blades located at a diameter 49, which is the same diameter as circular portion 50, portion 50 commencing a distance 31 from the surface of head 41, which is the same distance 31 of FIG. 3. Circular portion 50 is interrupted in six places by flat surfaces 51, each surface 51 also in turn interrupted by a chamfer flute 52 at the leading edge of each blade 48. Each flat surface 51 blends into the round shank 53 of the cutter substantially at distance 31 from the cutter head. Six oblong cutouts 54 are evenly spaced around the shank 53 and extend through the wall of shank 53 into the bore 46. The six blades 48 may be made from any suitable material such as those previously listed for blades 27 and 28 of inner cutter 20, and may be attached by any suitable means, such as previously described.

Figure 9:
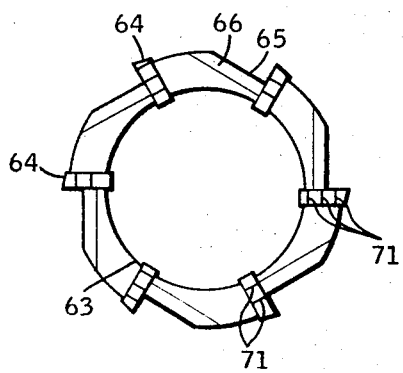
FIG. 9 is an end view of the blade end of the outer cutter of FIG. 8.
Figure 8:
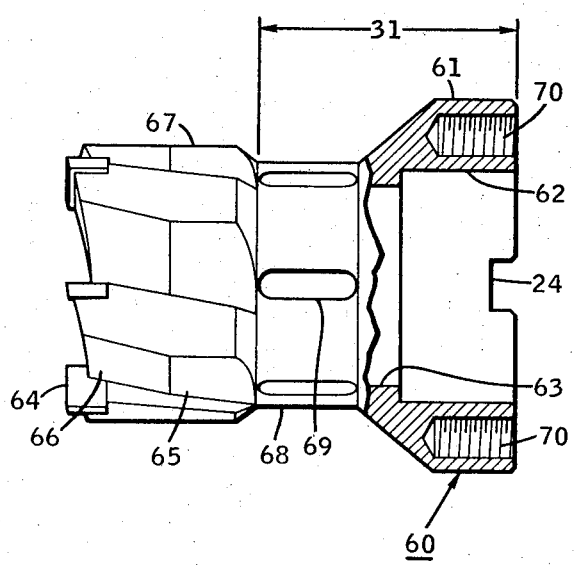
FIG. 8 is a side view of the outer cutter.

FIGS. 8 and 9 show details of the outer cutter 60, having a head 61. In the top of head 61 is a keyway 24 and a bore 62 of substantially the same diameter 42 and depth 43 of the head 41 of middle cutter 40 (FIG. 6). A second bore 63 of substantially the same diameter 49 of middle cutter 40 extends through the body of outer cutter 60, so that middle cutter 40 may snugly fit within outer cutter 60. Six blades 64 are spaced around the face end of the cutter, and in a like manner as middle cutter 40, there are six flat surfaces 65 and six chamfer flutes 66 located in relationship to the six blades 64, the flat surfaces extending the length of circular portion 67 and blending into the round shank 68 substantially at distance 31 from the cutter head. Six oblong cutouts 69 are spaced around the shank 68 in the same pattern as the oblong cutouts 54 of middle cutter 40, and cutouts 69 extend through the wall of shank 68 into the inner bore 63. Located in the face of head 61 are four equally spaced bores 70. The six blades 64 have small grooves 71 located in the face of the blades. These grooves 71 are chip breaker grooves which cause the chip generated by each blade to break into several smaller chips due to the small interruption of the blade cutting edge by these grooves 71. These chip breaker grooves may be spaced in any suitable manner, there being shown in FIG. 9 a pattern of three grooves in one blade and two in the next blade so that the grooves are staggered to prevent any buildup of ridges in the cut surface. All blades 26, 27, 48 and 64 may contain chip breaker grooves, but they have been omitted in the other Figures for clarity.

Figure 11:
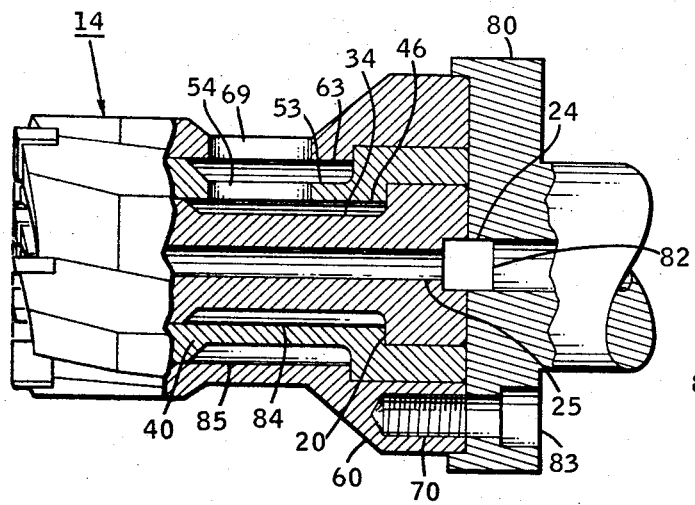
FIG. 11 is a section view taken along line 11—11 of FIG. 10.
Figure 10:
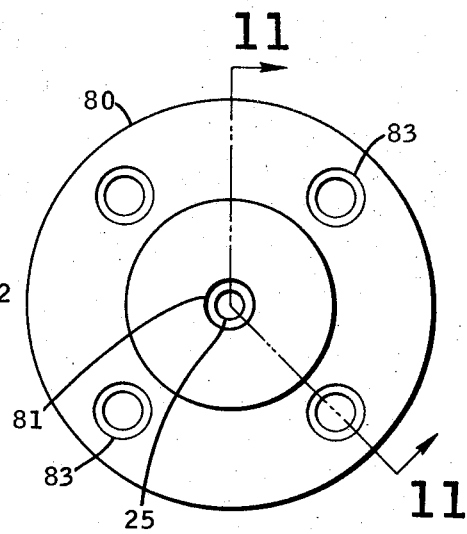
FIG. 10 is an end view of the plunge mill assembly.
Figure 12:
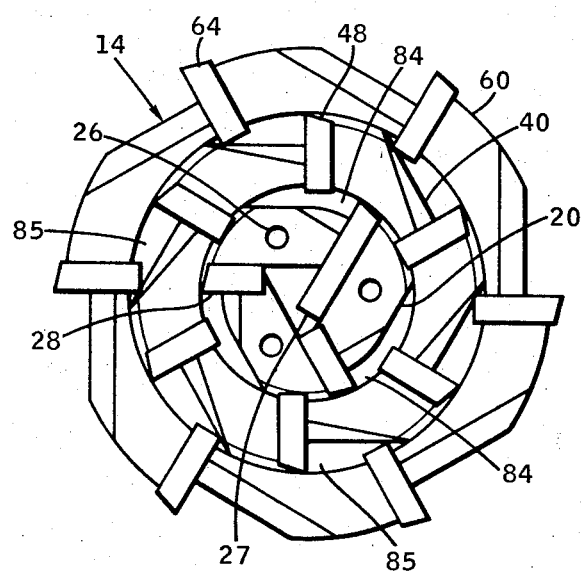
FIG. 12 is an end view of the blade end of the plunge mill assembly.

FIGS. 10, 11, and 12 show details of the assembled plung mill 14, FIG. 11 being a side view partially sectioned along line 11—11 of FIG. 10. Middle cutter 40 has been fitted into outer cutter 60 and inner cutter 20 has been fitted into middle cutter 40. The assembled cutters are held together by collet 80, having a center bore 81 to align with bore 25 of inner cutter 20 and a keyway 24 of the same dimensions as keyway 24 in each of the three cutters 20, 40, and 60. Located in the keyway 24 are two keys 82, spaced apart sufficiently to allow bore 81 to communicate with bore 25. Four bores 83 are spaced in the flange of collet 80 to align with the four bores 70 of outer cutter 60, and any suitable means inserted in the bores to attach collet 80 to cutter 60, such as, for example, screws, rods brazed in the bores, or tooling pins.

It will be observed that the shank 34 of inner cutter 20 and bore 46 of middle cutter 40 form a chamber 84, and in a like manner shank 53 of middle cutter 40 and bore 63 of outer cutter 60 form a second chamber 85. Chambers 84 and 85 communicate with one another in six places through oblong cutouts 54, and chamber 85 communicates to the outside by means of the six oblong cutouts 69. Thus it can be seen that cutting fluid may enter the plunge mill through collet bore 81, travel down bore 25 and exit the inner cutter 20 through the three holes 26 whereupon it floods the workpiece pocket surface being machined and re-enters the mill into chambers 84 and 85 and exhausts to the outside by means of cutouts 54 and 69, carrying the chips generated by inner cutter 20 and middle cutter 40 away from the machined surface. Additionally, cutting fluid travels up the flutes 66 and surfaces 65 (FIG. 8) of the outer cutter 60 to exhaust at the relief section formed by shank 68 with the plunged pocket of the workpiece, carrying away the chips generated by outer cutter 60.

As can most clearly be seen in FIG. 12, the blades of each cutter are staggered relative to the adjacent cutter, the relationship being established and maintained by the keys 82 in keyways 24. Blade 27 extends beyond the centerline of the mill to assure clean cutting at the center of the plunge, and since a portion of blade 27 is the slowest linear speed blade in the plunge mill, all blades having the same angular velocity and linear velocity varying as a function of the blades' radial distance, it may be made of a different material and have different rake and cutting edge angles than blades 28 of the inner cutter 20. In a like manner, the blades 28, 48, and 64 may be altered relative to one another in such characteristics as for example material, blade thickness, method of attachment, axial and radial rakes, cutting edge angles, corner angles, radial and end reliefs. Further, it should be understood that the number of blades per cutter and the total number of cutters fitted one into another is by way of example only, and greater or less numbers of each may be employed in order to obtain the most efficient milling of a particular sized pocket in a particular metal.

During pocket milling using the prior art method of end milling, chips were observed welding to the cutting edges of blades whenever an attempt was made to increase mill speeds or chip loads much beyond current maximums. This condition contributed significantly to the high wear experienced at these speeds and chip loads. As the chip was disengaged from the cutting edge by the formation of a new chip, minute particles of the cutting edge would adhere to the chip, resulting in increased cratering-type wear instead of the more desirable gradual attritious wear. This welding condition arises because of the poor thermal conductivity of these high-strength metals which prevents quick dissipation of the heat. Consequently, the heat is concentrated at the cutting edge of the tool. Welding of chips therefore occurs because of the inability to adequately cool the cutting tool. One of the most commonly used coolant methods is the application of a spray mist coolant at a point on the edge of the mill, which is inadequate for cooling during the slot widening process and totally unsatisfactory during plunging since little of the coolant reaches the hottest portion of the mill. Tests indicated the inherent effectiveness of individually cooling each blade by directing a continuous stream of coolant across the face of each blade near the chip-blade crevice, as embodied in the present invention. It is also essential to supply substantial amount of coolant, not only to keep the tool cool, but to remove chips and reduce cutting forces by acting as a lubricant.

Another problem which limits the machine time for pocket milling is the inability to remove chips fast enough to prevent the welding previously described and galling of the cut surface by reintroducing chips to the surface once they have been generated. Current mills, typically with four to eight cutting surfaces across the tool face creating chips which are one radius wide, must force these wide chips up a helical flute located adjacent to each cutting edge around the outside of the tool, resulting in too slow a removal rate. It is essential that the chips be small, that is low in mass, so that they may be more easily accelerated away from the cutting zone. Secondly, many "flutes" located immediately adjacent to each cutting edge must be available to assist the chips in fast escape as soon as they are generated. The combination of generating many smaller chips by providing many small staggered blades and providing more flute volume or escape passageways and locating them throughout the face area of the mill as shown most clearly in FIG. 12, has contributed to greatly increased metal removal rates. Additionally, the advantages of tailoring individual blades for their particular linear cutting speeds, as previously described, and the large diameter-to-length ratio of the mill to prevent tool chatter, have contributed their share to the increased removal rates.

Thus, it may be clearly appreciated that the present invention provides a great improvement in the efficient removal of metal, resulting in a very significant reduction in machining time of high-strength thermal-resistant metals, approaching the machining time of aluminum alloys.

It should be clear from the foregoing that the figures and description herein have been drawn to the basic principle of the invention and that additional or modified parts and materials may be utilized to increase or decrease the number of blades, flutes, and coolant holes, or length and diameter dimensions, and the invention is not to be restricted to the specific details, arrangement of parts, or number and shape of parts herein set forth, since various modifications may be effected without departing from the spirit and scope of the invention.

We claim:

1. A tool for pocket milling comprising a collet, a first cutter having a face end for milling and head end for attachment to said collet and containing a bore substantially along the longitudinal axis terminating with at least one hole in the face of said first cutter, at least one first blade located in the face of said first cutter, and a flute located adjacent to the leading edge of said first blade and extending along said first cutter body to the shank of said first cutter, a second cutter having a face end for milling and a head end for attachment to said collet and containing a bore substantially along the longitudinal axis of a size and shape to receive and contain said first cutter therein, a plurality of second blades located in said face end of said second cutter, a plurality of second flutes, at least one flute located adjacent the leading edge of each of said second blades and a first plurality of cutouts located in the wall of said second cutter communicating with said first flutes to provide exits from said tool.

2. The tool of claim 1 further comprising a third cutter having a face end for milling and a head end for attachment to said collet and having a bore substantially along the longitudinal axis sized and shaped to receive and contain said second cutter therein, a plurality of third blades located in said face end of said third cutter in a staggered relationship with said second blades, a plurality of third flutes, at least one flute located adjacent the leading edge of each of said third blades, and a second plurality of cutouts located in the wall of said third cutter communicating with said first and second flutes and said first plurality of cutouts to provide exits from said tool.

* * * * *